(12) United States Patent
Du

(10) Patent No.: US 9,886,922 B2
(45) Date of Patent: Feb. 6, 2018

(54) LIQUID CRYSTAL DISPLAY (LCD) APPARATUS, LCD PANEL AND DRIVING METHOD USING THE SAME

(71) Applicant: Shenzhen China Star Optoelectronics Technology Co., Ltd., Shenzhen (CN)

(72) Inventor: Peng Du, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/906,571

(22) PCT Filed: Dec. 30, 2015

(86) PCT No.: PCT/CN2015/099671
§ 371 (c)(1),
(2) Date: Jan. 21, 2016

(87) PCT Pub. No.: WO2017/075886
PCT Pub. Date: May 11, 2017

(65) Prior Publication Data
US 2017/0178578 A1 Jun. 22, 2017

(30) Foreign Application Priority Data

Nov. 4, 2015 (CN) .......................... 2015 1 0740856

(51) Int. Cl.
G09G 3/36 (2006.01)
G02F 1/1362 (2006.01)
(Continued)

(52) U.S. Cl.
CPC ......... *G09G 3/3614* (2013.01); *G02F 1/1368* (2013.01); *G02F 1/134309* (2013.01);
(Continued)

(58) Field of Classification Search
CPC ............... G09G 3/3614; G09G 3/3607; G09G 2300/0443; G09G 2300/0809;
(Continued)

(56) References Cited

U.S. PATENT DOCUMENTS 7,391,402 B2 6/2008 Lee
8,743,097 B2 6/2014 Shang
(Continued)

FOREIGN PATENT DOCUMENTS

CN 101609651 12/2009
CN 102455552 5/2012
(Continued)

*Primary Examiner* — Charles Hicks

(57) ABSTRACT

An array substrate is described. The array substrate with a polarity inversion of drive voltage signal in a plurality of data lines comprises a plurality of gate line sets being sequentially arranged, wherein each gate line set comprises two gate lines having an odd gate line and an even gate line respectively; a plurality of data line sets being sequentially arranged and vertically interlaced with the gate line sets, wherein each data line set comprises two data lines having an odd data line and an even data line respectively; wherein a plurality of sub-pixels are sequentially disposed between two adjacent gate line sets, connection positions of a portion of sub-pixels to the odd gate line and the even gate line in one gate line set respectively are changed in a predetermined amount of data line spaced apart.

11 Claims, 10 Drawing Sheets

(51) Int. Cl.
*G02F 1/1368* (2006.01)
*G02F 1/1343* (2006.01)

(52) U.S. Cl.
CPC ..... *G02F 1/136286* (2013.01); *G09G 3/3607* (2013.01); *G02F 2001/134345* (2013.01); *G09G 2300/0443* (2013.01); *G09G 2300/0809* (2013.01)

(58) Field of Classification Search
CPC ......... G02F 1/134309; G02F 1/136286; G02F 1/1368; G02F 2001/134345
See application file for complete search history.

(56) References Cited

U.S. PATENT DOCUMENTS

| | | |
|---|---|---|
| 9,341,903 B2 | 5/2016 | Nakano et al. |
| 2010/0118058 A1 | 5/2010 | Murai et al. |
| 2010/0134483 A1 | 6/2010 | Huang et al. |
| 2011/0242065 A1* | 10/2011 | Hsu ........................ G09G 3/006 345/204 |

FOREIGN PATENT DOCUMENTS

| | | |
|---|---|---|
| CN | 103975270 | 8/2014 |
| KR | 10-0741894 | 7/2007 |

* cited by examiner

LIQUID CRYSTAL DISPLAY (LCD) APPARATUS, LCD PANEL AND DRIVING METHOD USING THE SAME

RELATED APPLICATIONS

This application is a National Phase of PCT Patent Application No. PCT/CN2015/099671 having International filing date of Dec. 30, 2015, which claims the benefit of priority of Chinese Patent Application No. 201510740856.7 filed on Nov. 4, 2015. The contents of the above applications are all incorporated by reference as if fully set forth herein in their entirety.

FIELD AND BACKGROUND OF THE INVENTION

The present invention relates to a technical field of a liquid crystal display (LCD) apparatus, LCD panel, LCD array substrate and driving method using the same, and more particularly to a thin film transistor (TFT) LCD apparatus, TFT-LCD panel, TFT-LCD array substrate and driving method using the same.

Conventionally, a manufacturing cost reduction is a critical issue of the LCD's manufacturing procedure. A data line sharing (DLS) mechanism is commonly used wherein the number of gate lines is doubled and the number of data lines is halved to diminish the amount of source driver for thus lowering the costs.

Regarding a driving method of conventional LCD panel, since the switch frequency of the data line polarity using a column inversion is lower, the power consumption of the driving manner is reduced and widely used. FIG. 1 is a schematic view of a TFT-LCD with a data line sharing (DLS) mechanism and column inversion in the prior art. G_1 to G_8 represent the serial numbers of the gate lines and D_1 to G_5 represent the serial numbers of the data lines. Each region enclosed by a dashed line is defined as a sub-pixel wherein the positive and negative signs in the sub-pixels represent the polarities of the driving voltage. The sub-pixel polarity of one data line in a column is opposite the sub-pixel polarity in the left or right data line related the one data line, which is defined as a column inversion manner.

FIG. 1 is a conventional red-green-blue (RGB) structure. When the RGB structure is operated with the DLS mechanism, the electrical potential of common electrode E_cm will drift in some color mixing frames, e.g. cyan color frame formed by green and blue colors, thereby causing poor display quality, e.g. crosstalk, since the capacitor coupling is formed by liquid crystal capacitance and storage capacitance between sub-pixel electrode E_pixel and common electrode E_cm. FIG. 2a is a schematic signal waveform of the data lines in FIG. 1 when the display panel is in a color-mixing status. In a cyan color frame formed by green and blue colors, the level of common electrode E_cm is 7V (voltage) wherein the positive polarity voltage of the gray level L255 is 14V and the negative polarity voltage is 0V. In FIGS. 1 and 2, data line D_2 is composed of green sub-pixels G and blue sub-pixels B in a direct current signal waveform with a negative polarity voltage 0V. The data line D_3 has positive polarity wherein when the odd data lines are switched on, the voltage written into the red sub-pixel is common voltage 7V and the even data lines are switched on, the voltage written into the green sub-pixel is 14V. In the data line D_4, when the odd data lines are switched on, the voltage written into the blue sub-pixel is 0V and the even data lines are switched on, the voltage written into the red sub-pixel is common voltage 7V. However, the waveform of data lines D_3 and D_4 from low level to high level or vice versa are similar, as shown in dashed line regions. In this case, when the data signal is written to the sub-pixel electrode E_pixel, the liquid crystal capacitor C_lc and storage capacitor C_st related to the common electrode E_cm generates a coupling capacitance therebetween so that electrical potential of the common electrode E_cm is drifted. In FIG. 2a, when the signal levels in data lines D_3 and D_4 are changed from low to high, the common voltage in the whole column sub-pixels pulls high. On the contrary, when the signal levels in data lines D_3 and D_4 are changed from high to low, the common voltage in the whole column sub-pixels pulls low. Thus, the changed common voltage is unstable, which may downgrade the display quality due to crosstalk effect. As shown in FIG. 2b, when a white display region 200 is added to a color-mixing background region, the brightness of the background regions 201 in the lateral sides of the white display region 200 is different from the brightness in the region 202.

FIG. 3 is a schematic view of a conventional display panel with white, red, green and blue (WRGB) sub-pixels. When the WRGB display panel shown a pure color, FIG. 3 has the same problem as FIG. 2b, thereby causing crosstalk. As shown FIG. 4, when a white display region 400 is added to a color-mixing background region, the brightness of the background regions 401 in the lateral sides of the white display region 200 is different from the brightness in the region 402.

SUMMARY OF THE INVENTION

Therefore, one objective of the present invention is to provide a thin film transistor (TFT) LCD apparatus, TFT-LCD panel, TFT-LCD array substrate and driving method using the same to solve the problem of crosstalk.

Based on the above objective, the present invention sets forth an array substrate with a polarity inversion of drive voltage signal in a plurality of data lines. The array substrate comprises: a plurality of gate line sets being sequentially arranged, wherein each gate line set comprises two gate lines which are composed of an odd gate line and an even gate line respectively; a plurality of data line sets being sequentially arranged and vertically interlaced with the gate line sets, wherein each data line set comprises two data lines which are composed of an odd data line and an even data line respectively; wherein a plurality of sub-pixels are sequentially disposed between two adjacent gate line sets, connection positions of a portion of sub-pixels to the odd gate line and the even gate line in one gate line set respectively are changed in a predetermined amount of data line spaced apart so that the portion of sub-pixels in each same row are connected to the odd gate line and the even gate line respectively in the one gate line set, and wherein each sub-pixel is connected to one gate line and one data line respectively by way of a switch unit, and a polarity of the drive voltage signal of the sub-pixels with same color type in two adjacent data lines is inverted each other.

In one embodiment, an array substrate with a polarity inversion of drive voltage signal in a plurality of data lines comprises: a plurality of gate line sets being sequentially arranged, wherein each gate line set comprises two gate lines which are composed of an odd gate line and an even gate line respectively; a plurality of data line sets being sequentially arranged and vertically interlaced with the gate line sets, wherein each data line set comprises two data lines which are composed of an odd data line and an even data line respectively; wherein a plurality of sub-pixels are sequentially disposed between two adjacent gate line sets, connection positions of a portion of sub-pixels to the odd gate line and the even gate line in one gate line set respectively are changed in a predetermined amount of data line spaced apart so that the portion of sub-pixels in each same row are connected to the odd gate line and the even gate line respectively in the one gate line set, and a polarity of the drive voltage signal of the sub-pixels with same color type in two adjacent data lines is inverted each other.

Preferably, each sub-pixel is connected to one gate line and one data line respectively by way of a switch unit.

Preferably, the switch unit is a thin film transistor comprising a gate electrode connected to one gate line, a source electrode connected to one data line, and a drain electrode connected to one sub-pixel.

Preferably, a polarity of the drive voltage signal of the sub-pixels with same color type in two adjacent data lines is inverted each other.

Preferably, the sub-pixels comprise a red sub-pixel, a green sub-pixel and a blue sub-pixel, which are sequentially arranged.

The present invention can prevent the electrical potential of the common electrode from drifting due to the coupling effect of the sub-pixel in order to increase the stability of electrical potential of the common electrode in the DLS mechanism and improve the display quality.

BRIEF DESCRIPTION OF THE SEVERAL VIEWS OF THE DRAWINGS

FIG. 2b is a schematic view of a display region with the color-mixing status in FIG. 2a;

DESCRIPTION OF SPECIFIC EMBODIMENTS OF THE INVENTION

Figure 1:
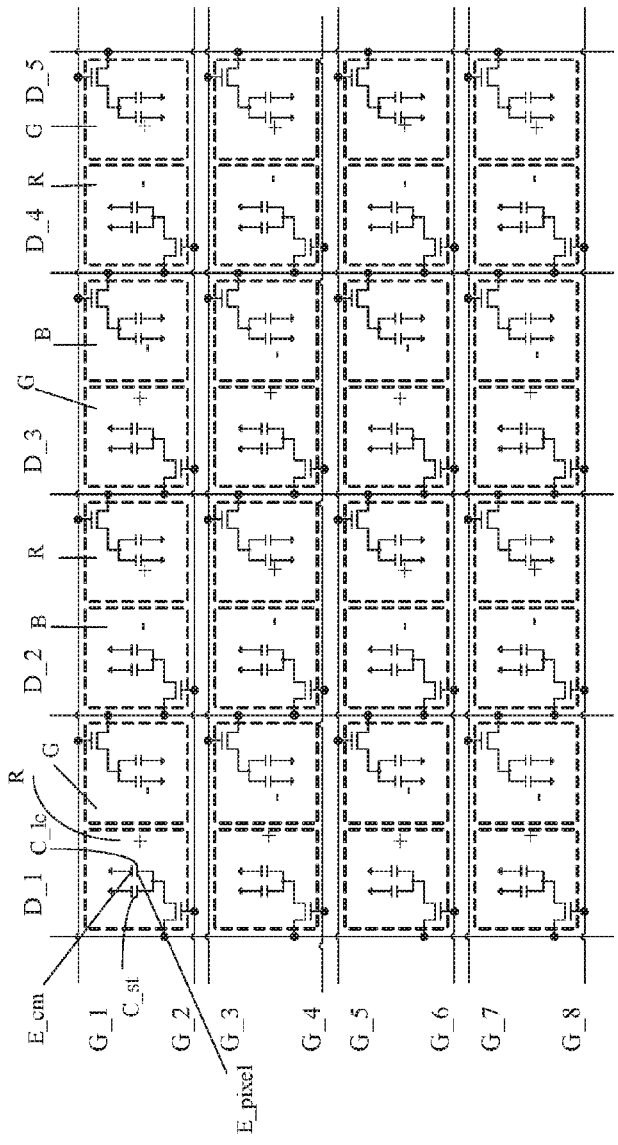
FIG. 1 is a schematic view of an LCD with a conventional data line sharing (DLS) mechanism and column inversion.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Figure 5:
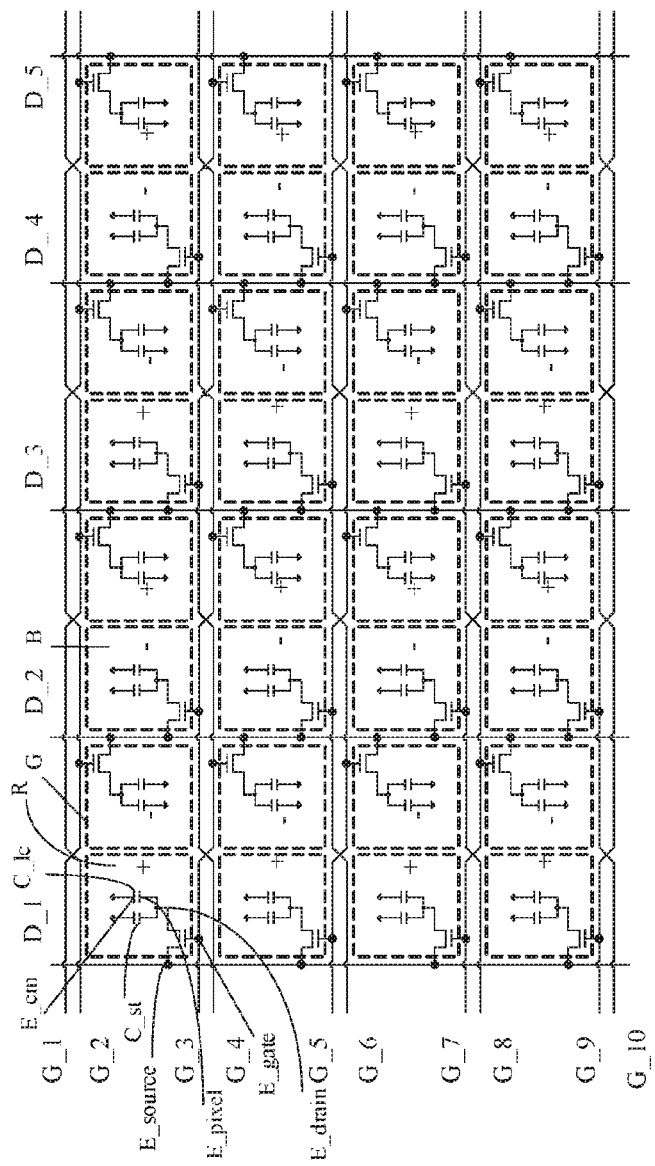
FIG. 5 is a schematic view of an LCD panel according to one embodiment of the present invention.

Please refer to FIG. 5, which is a schematic view of an LCD panel according to one embodiment of the present invention. The LCD panel includes five gate line sets, but not limited, in a sequentially horizontal arrangement and five data lines, but not limited, in a sequentially vertical arrangement. Each gate line set includes two gate lines, e.g. $G\_1$ and $G\_2$, $G\_3$ and $G\_4$, $G\_5$ and $G\_6$, $G\_7$ and $G\_8$, and $G\_9$ and $G\_10$ wherein the odd gate lines are $G\_1$, $G\_3$, $G\_5$, $G\_7$ and $G\_9$ and the even gate lines are $G\_2$, $G\_4$, $G\_6$, $G\_8$ and $G\_10$. The data lines include odd data lines $D\_1$, $D\_3$ and $D\_5$ and even data lines $D\_2$ and $D\_4$. A plurality of red sub-pixels R, green sub-pixels G and blue sub-pixels B are sequentially disposed between two adjacent gate line sets. In FIG. 5, the red sub-pixels are electrically connected to the gate lines $G\_3$ and $G\_4$ and one side of the data line $D\_1$. For an example of data line $D\_1$, the red sub-pixel R is connected to gate line $G\_3$ and data line $D\_1$ by way of a switch unit, e.g. thin film transistor T. The gate electrode $E\_{gate}$ of TFT is connected to gate line $G\_3$, the source electrode $E\_{source}$ of TFT is connected to data line $D\_1$, and drain electrode $E\_{drain}$ of TFT is connected to red sub-pixel R. The rest of sub-pixels in FIG. 5 are electrically connected to gate lines and data lines respectively based on the red sub-pixel with gate line $G\_3$ and data line $D\_1$. In the interlaced node of the gate line set $G\_3$ and $G\_4$ and data line $D\_2$, the sub-pixel in the left-hand side of data line $D\_2$ is connected to the gate line $G\_3$ and the sub-pixel in the right-hand side of data line $D\_2$ is connected to the gate line $G\_4$. In other words, two adjacent gate lines in the gate line set are interlaced in at least one data line interval, e.g. every other data line. That is, the connection positions of the two adjacent gate lines are exchanged once in every one data line spaced apart. For example, the gate line set $G\_1$ and $G\_2$ includes an interlaced node between data lines $D\_1$ and $D\_2$. When passing $D\_1$, $G\_1$ is disposed above the $G\_2$, and when passing $D\_2$, $G\_2$ is disposed above the $G\_1$.

Figure 2A:
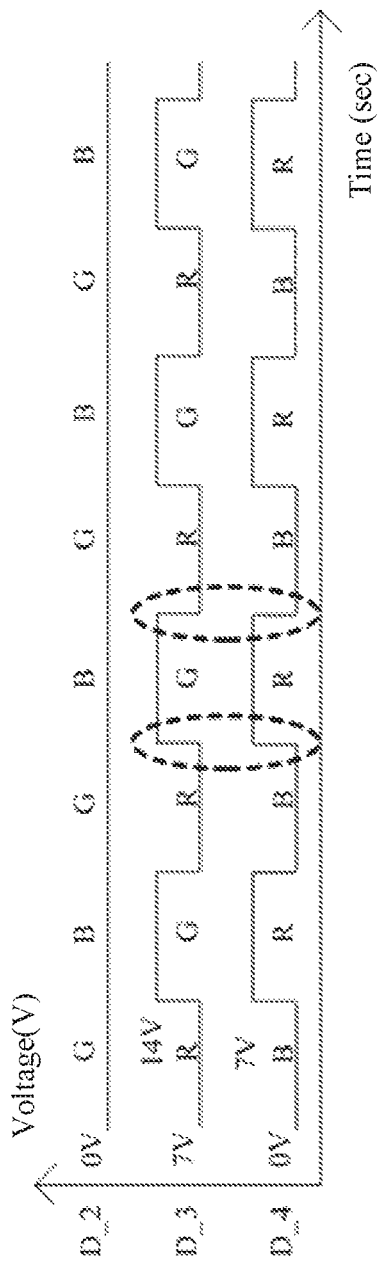
FIG. 2a is a schematic signal waveform of the data lines in FIG. 1 when the display panel is in a color-mixing status.
Figure 2B:
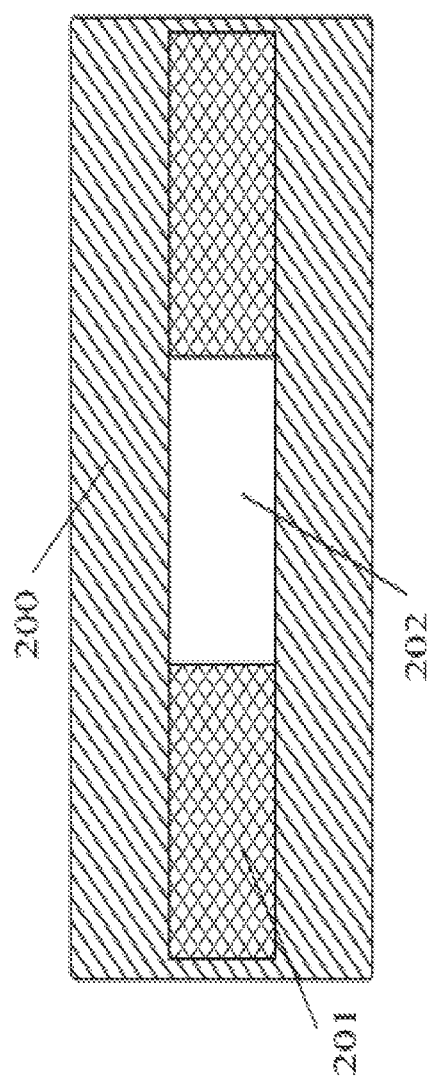
Figure 3:
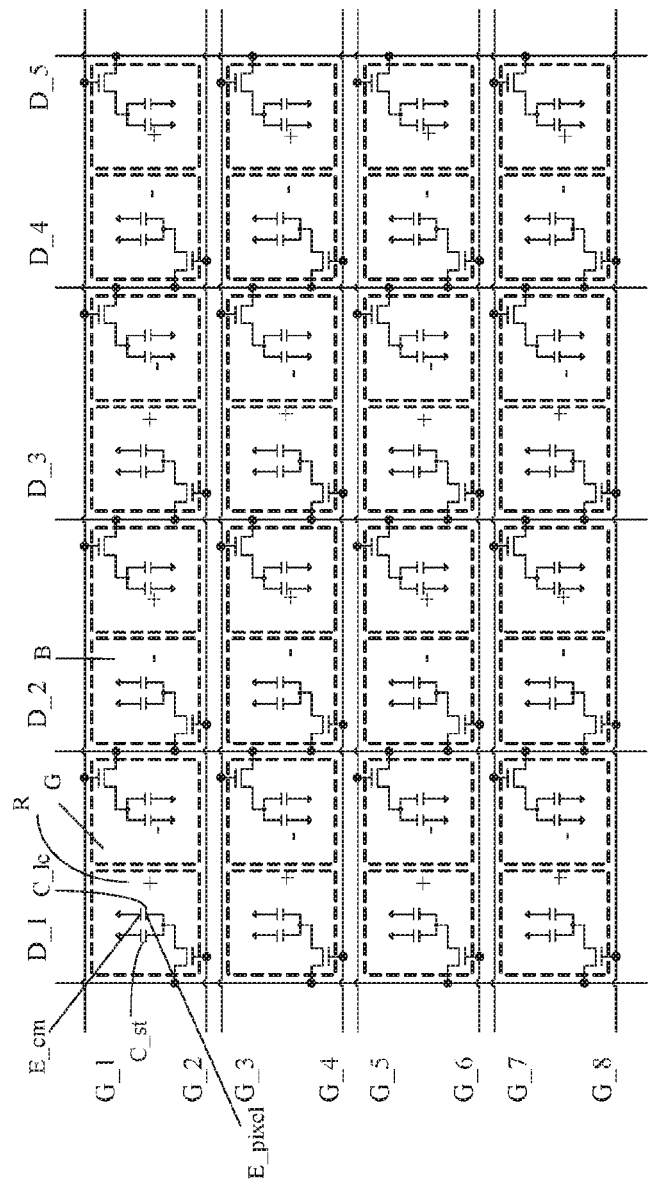
FIG. 3 is a schematic view of a conventional display panel with white, red, green and blue (WRGB) sub-pixels.
Figure 4:
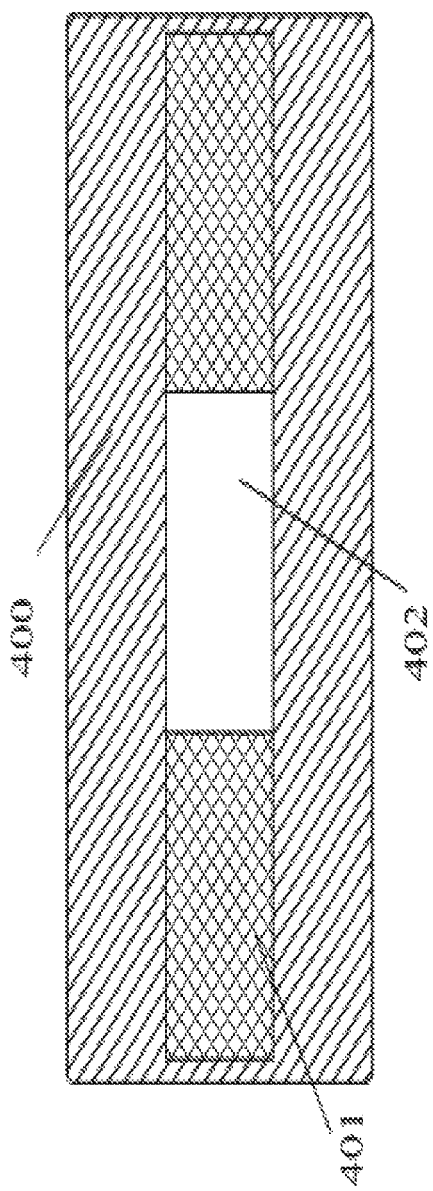
FIG. 4 is a schematic view of crosstalk between data lines on the display panel.
Figure 6A:
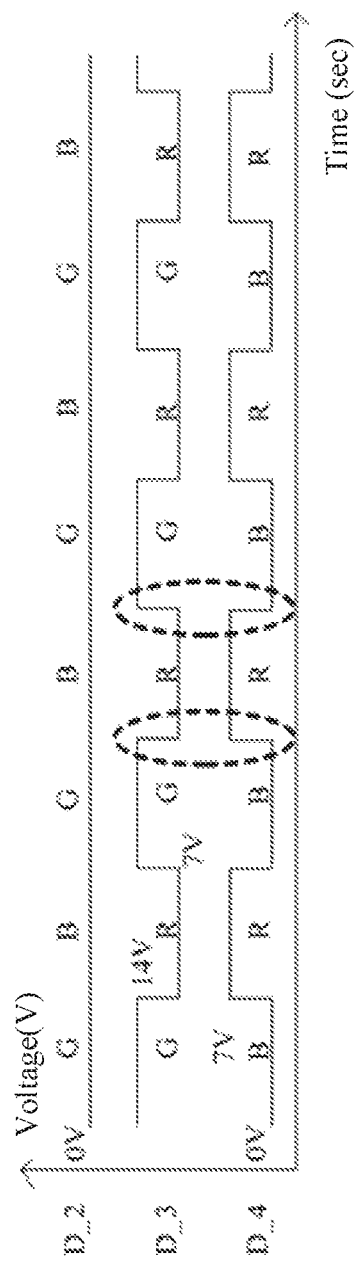
FIG. 6a is a schematic signal waveform of the data lines in FIG. 5 when the display panel is in the color-mixing status according to one embodiment of the present invention.

FIG. 6a is a schematic signal waveform of the data lines in FIG. 5 when the display panel is in the color-mixing status according to one embodiment of the present invention. Similar to FIG. 2a, the data line $D\_2$ in FIG. 5 is composed of green sub-pixels G and blue sub-pixels B in a direct current signal waveform with a negative polarity voltage 0V. The data line $D\_3$ includes positive polarity voltage wherein when the odd data lines are switched on, the voltage written into the green sub-pixel is voltage 14V (gray level L255) and the even data lines are switched on, the voltage written into the red sub-pixel is common voltage 7V (gray level L0) under a cyan color frame. Similarly, in the data line $D\_4$, when the odd data lines are switched on, the voltage written into the blue sub-pixel is negative polarity voltage 0V (gray level L255) and the even data lines are switched on, the voltage written into the red sub-pixel is common voltage 7V, e.g. negative polarity voltage.

Figure 6B:
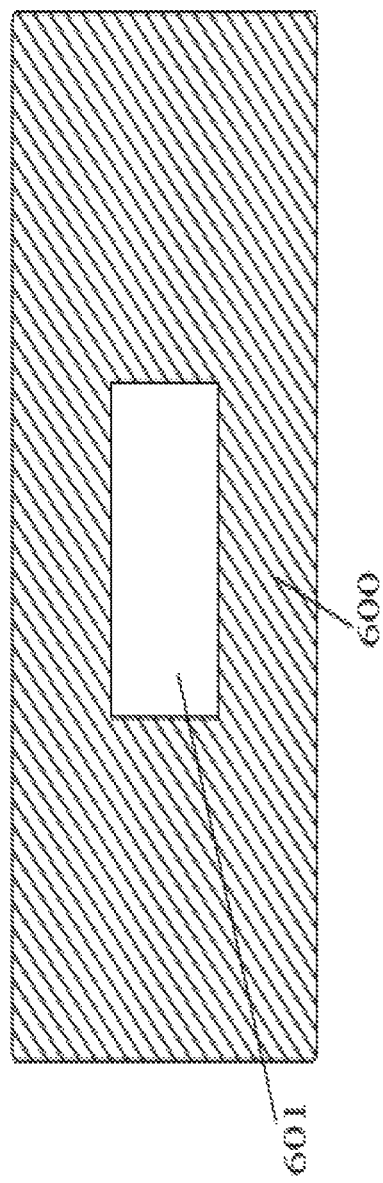
FIG. 6b is a schematic view of a display region with the color-mixing status in FIG. 6a according to one embodiment of the present invention.

In FIG. 6a, the signal voltages of the data lines $D\_2$ and $D\_3$ are switched at the same time but two switch directions of the signal voltages is opposite wherein one switch direction is from high to low and the other is from low to high. The coupling effect between liquid crystal $C\_{lc}$ and storage capacitance $C\_{st}$ along the two switch directions is formed but the capacitance coupling effect along the two switch directions is balanced due to counteraction. Thus, the electrical potential of the common electrode $E\_{cm}$ will not be drifted to be stable, thereby improving the display quality of the LCD panel. As shown in FIG. 6b, when a white frame 600 is added to a color-mixing background, the background regions 601 around the white frame 600 has the same brightness.

Figure 7:
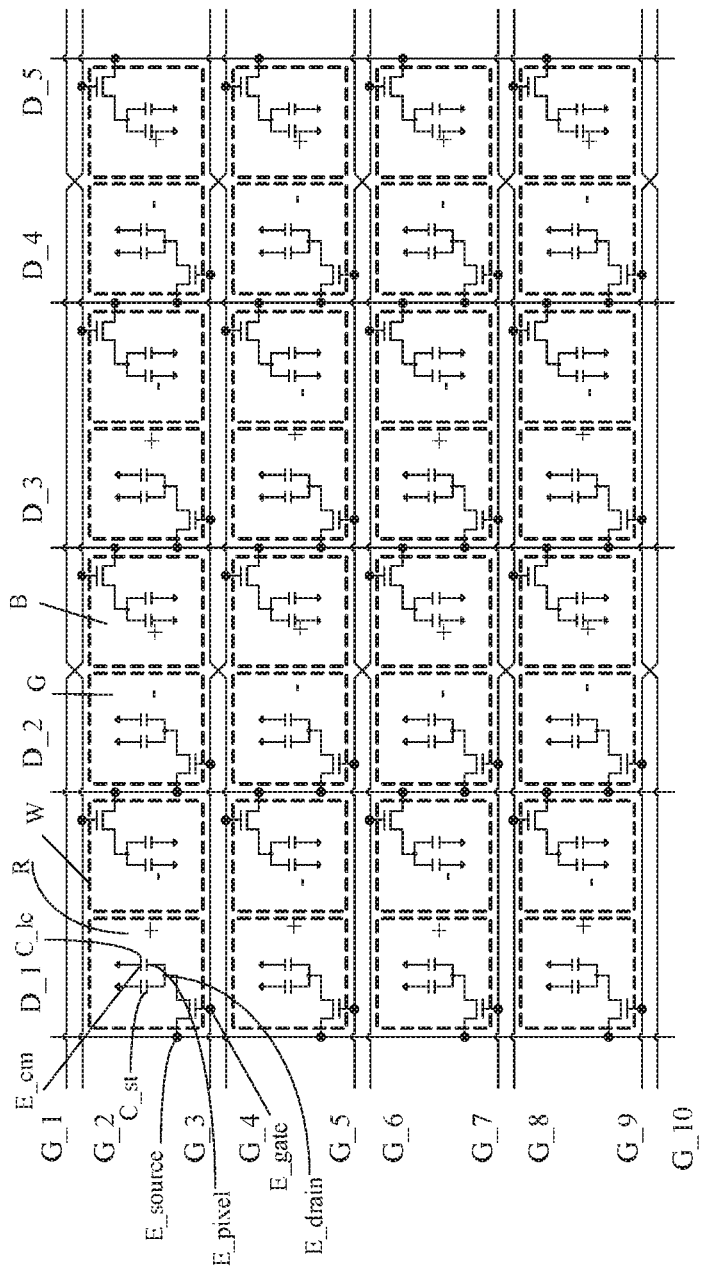
FIG. 7 is a schematic view of an LCD panel according to another embodiment of the present invention.

Please refer to FIG. 7, which is a schematic view of an LCD panel according to another embodiment of the present invention. The LCD panel includes five gate line sets, but not limited, in a sequentially horizontal arrangement and five data lines, but not limited, in a sequentially vertical arrangement. Each gate line set includes two gate lines, e.g. G_1 and G_2, G_3 and G_4, G_5 and G_6, G_7 and G_8, and G_9 and G_10. The odd gate lines are G_1, G_3, G_5, G_7 and G_9 and the even gate lines are G_2, G_4, G_6, G_8 and G_10. The data lines include odd data lines D_1, D_3 and D_5 and even data lines D_2 and D_4. A plurality of red sub-pixels R, green sub-pixels G and blue sub-pixels B are sequentially disposed between two adjacent gate line sets. In FIG. 7, the red sub-pixels are electrically connected to the gate lines G_3 and G_4 and one side of the data line D_1. For an example of data line D_1, the red sub-pixel R is connected to gate line G_3 and data line D_1 by way of a switch unit, e.g. thin film transistor T. The gate electrode E_gate of TFT is connected to gate line G_3, the source electrode E_source of TFT is connected to data line D_1, and drain electrode E_drain of TFT is connected to red sub-pixel R. The rest of sub-pixels in FIG. 7 are electrically connected to gate lines and data lines respectively based on the red sub-pixel with gate line G_3 and data line D_1. The LCD panel in FIG. 7 is similar to that in FIG. 5. In the interlaced node of the gate line set G_3 and G_4 and data line D_2, the sub-pixel in the left-hand side of data line D_2 is connected to the gate line G_4 and the sub-pixel in the right-hand side of data line D_2 is connected to the gate line G_3. In the interlaced node of the gate line set G_3 and G_4 for data lines D_3 and D_4, the sub-pixels in the left-hand side of data line D_3 and D_4 are connected to the gate line G_3 and the sub-pixels in the right-hand side of data lines D_3 and D_4 are connected to the gate line G_4. In other words, two adjacent gate lines in the gate line set are interlaced in every two data lines for data lines D_3 and D_4 in FIG. 7. That is, the positions of the two adjacent gate lines are exchanged once in every two data lines spaced apart. For example, the gate line set G_1 and G_2 includes an interlaced node between data lines D_1 and D_2. When passing D_1 and D_2, G_1 is disposed above the G_2. When G_1 and G_2 are between D_2 and D_3, an interlaced mode is formed. When passing D_3 and D_4, G_2 is disposed above the G_1. When G_1 and G_2 are between D_4 and D_5, another interlaced mode is formed.

Figure 8:
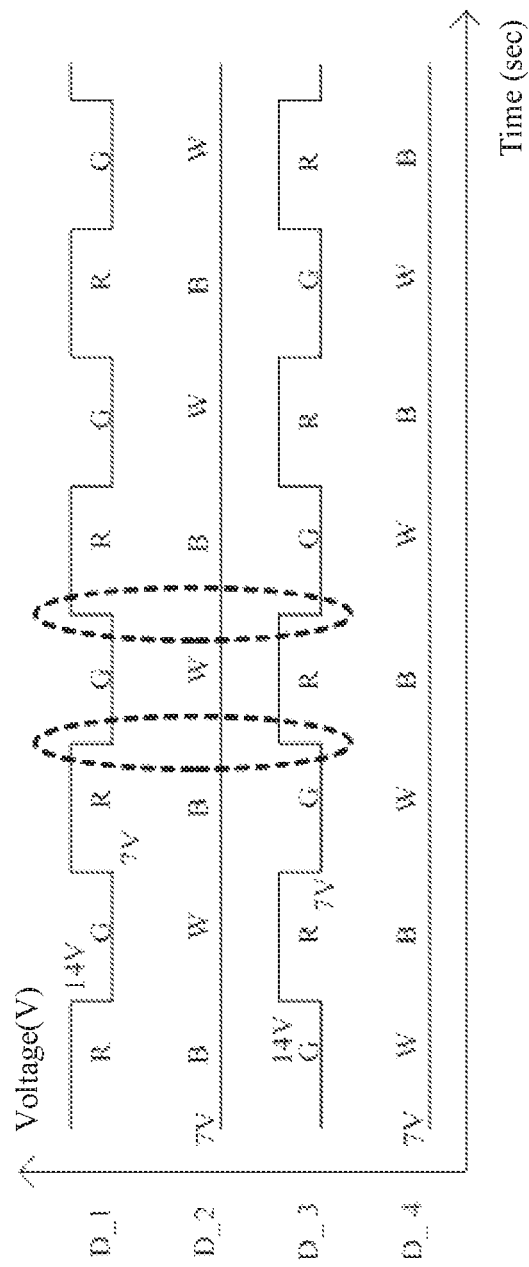
FIG. 8 is a schematic signal waveform of the data lines in FIG. 7 when the display panel is in the color-mixing status according to another embodiment of the present invention.

FIG. 8 is a schematic signal waveform of the data lines in FIG. 5 when the display panel is in the color-mixing status according to one embodiment of the present invention. The data lines D_2 and D_4 are composed of blue sub-pixels B and white sub-pixels W in a direct current signal waveform with a negative polarity voltage 7V (gray level L0). The data line D_1 has positive polarity voltage wherein when the odd data lines are switched on, the voltage written into the red sub-pixel is 14V and the even data lines are switched on, the voltage written into the green sub-pixel is 7V. The data line D_3 has positive polarity voltage wherein when the odd data lines are switched on, the voltage written into the green sub-pixel is common voltage 7V and the even data lines are switched on, the voltage written into the red sub-pixel is 14V. In FIG. 8, the signal voltages of the data lines D_1 and D_3 are switched at the same time but two switch directions of the signal voltages is opposite wherein one switch direction is from high to low and the other is from low to high. The coupling effect between liquid crystal C_lc and storage capacitance C_st along the two switch directions is formed but the capacitance coupling effect along the two switch directions is balanced due to counteraction. The electrical potential of the common electrode E_cm will not be drifted in a stable status, thereby improving the display quality of the LCD panel.

The present invention uses the array substrate in FIG. 5 and FIG. 7 in the LCD apparatus and LCD panel for preventing the electrical potential of the common electrode from drifting due to the coupling effect between the sub-pixel electrodes in order to improve the display quality of the LCD apparatus.

The present invention can prevent the electrical potential of the common electrode from drifting due to the coupling effect of the sub-pixel in order to increase the stability of electrical potential of the common electrode in the DLS mechanism and improve the display quality.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. An array substrate with a polarity inversion of drive voltage signal in a plurality of data lines, the array substrate comprising:
   a plurality of gate line sets being sequentially arranged, wherein each gate line set comprises two gate lines which are composed of an odd gate line and an even gate line respectively;
   a plurality of data line sets being sequentially arranged and vertically interlaced with the gate line sets, wherein each data line set comprises two data lines which are composed of an odd data line and an even data line respectively;
   wherein a plurality of sub-pixels are sequentially disposed between two adjacent gate line sets, connection positions of a portion of sub-pixels to the odd gate line and the even gate line in one gate line set respectively are changed in a predetermined amount of data line spaced apart so that the portion of sub-pixels in each same row are connected to the odd gate line and the even gate line respectively in the one gate line set, and wherein each sub-pixel is connected to one gate line and one data line respectively by way of a switch unit, and a polarity of the drive voltage signal of the sub-pixels with same color type in two adjacent data lines is inverted each other.

2. An array substrate with a polarity inversion of drive voltage signal in a plurality of data lines, the array substrate comprising:
   a plurality of gate line sets being sequentially arranged, wherein each gate line set comprises two gate lines which are composed of an odd gate line and an even gate line respectively;
   a plurality of data line sets being sequentially arranged and vertically interlaced with the gate line sets, wherein each data line set comprises two data lines which are composed of an odd data line and an even data line respectively;
   wherein a plurality of sub-pixels are sequentially disposed between two adjacent gate line sets, connection positions of a portion of sub-pixels to the odd gate line and the even gate line in one gate line set respectively are changed in a predetermined amount of data line spaced apart so that the portion of sub-pixels in each same row are connected to the odd gate line and the even gate line respectively in the one gate line set, and a polarity of the drive voltage signal of the sub-pixels with same color type in two adjacent data lines is inverted each other.

3. The array substrate of claim 2, wherein each sub-pixel is connected to one gate line and one data line respectively by way of a switch unit.

4. The array substrate of claim 3, wherein the switch unit is a thin film transistor comprising a gate electrode connected to one gate line, a source electrode connected to one data line, and a drain electrode connected to one sub-pixel.

5. The array substrate of claim 2, wherein a polarity of the drive voltage signal of the sub-pixels with same color type in two adjacent data lines is inverted each other.

6. The array substrate of claim 2, wherein the sub-pixels comprises a red sub-pixel, a green sub-pixel and a blue sub-pixel, which are sequentially arranged.

7. A liquid crystal display (LCD) panel using an array substrate, the array substrate comprising:
a plurality of gate line sets being sequentially arranged, wherein each gate line set comprises two gate lines which are composed of an odd gate line and an even gate line respectively;
a plurality of data line sets being sequentially arranged and vertically interlaced with the gate line sets, wherein each data line set comprises two data lines which are composed of an odd data line and an even data line respectively;
wherein a plurality of sub-pixels are sequentially disposed between two adjacent gate line sets, connection positions of a portion of sub-pixels to the odd gate line and the even gate line in one gate line set respectively are changed in a predetermined amount of data line spaced apart so that the portion of sub-pixels in each same row are connected to the odd gate line and the even gate line respectively in the one gate line set, and a polarity of the drive voltage signal of the sub-pixels with same color type in two adjacent data lines is inverted each other.

8. The LCD panel of claim 7, wherein each sub-pixel is connected to one gate line and one data line respectively by way of a switch unit.

9. The LCD panel of claim 8, wherein the switch unit is a thin film transistor comprising a gate electrode connected to one gate line, a source electrode connected to one data line, and a drain electrode connected to one sub-pixel.

10. The LCD panel of claim 7, wherein a polarity of the drive voltage signal of the sub-pixels with same color type in two adjacent data lines is inverted each other.

11. The LCD panel of claim 7, wherein the sub-pixels comprises a red sub-pixel, a green sub-pixel and a blue sub-pixel, which are sequentially arranged.

* * * * *